United States Patent [19]
Trieb

[11] Patent Number: 6,039,171
[45] Date of Patent: Mar. 21, 2000

[54] CONVEYOR SYSTEM FOR TRANSPORTING GOODS

[75] Inventor: Herbert Trieb, Wolfurt, Austria

[73] Assignee: Konrad Doppelmayr & Sohn Maschinenfabrik mbH & Co. KG, Wolfurt, Australia

[21] Appl. No.: 09/054,921

[22] Filed: Apr. 3, 1998

[30] Foreign Application Priority Data

Apr. 8, 1997 [AT] Austria ....................................... 591/97

[51] Int. Cl.[7] ............................................. B65G 15/44
[52] U.S. Cl. ............................................. 198/699; 198/821
[58] Field of Search ............................. 198/690.2, 699, 198/821, 833

[56] References Cited

U.S. PATENT DOCUMENTS

| 781,138 | 1/1905 | Etcreverry | 198/821 |
|---|---|---|---|
| 1,009,264 | 11/1911 | Spadone | 198/821 |
| 3,854,571 | 12/1974 | Siirtola | 198/699 X |
| 4,667,812 | 5/1987 | Wixey | 198/821 |
| 5,791,454 | 8/1998 | Trieb | 198/821 X |

*Primary Examiner*—James R. Bidwell
*Attorney, Agent, or Firm*—Herbert L. Lerner; Laurence A. Greenberg; Werner H. Stemer

[57] ABSTRACT

The conveyor system for transporting goods has an endless conveyor belt which is guided about deflection drums in the two end stations. The conveyor belt assembly is provided with support beams oriented transversely to the conveying direction and the support beams are supported on two endless conveyor cables disposed laterally outside the conveyor belt. The cables carry the loads created by the conveying of goods. The endless conveyor cables are also guided about the deflection drums and the transverse support beams are secured to the conveyor cables with spring-loaded clamp assemblies.

8 Claims, 7 Drawing Sheets

CONVEYOR SYSTEM FOR TRANSPORTING GOODS

BACKGROUND OF THE INVENTION

1. Field of the Invention

The present invention relates to a conveyor system for transporting goods with an endless conveyor belt, which is guided over deflection drums in the two end stations and which has support beams oriented transversely to the conveying direction. Conveyor cables are disposed laterally outside the conveyor belt which absorb and carry the loads when goods are conveyed on the conveyor system.

Prior art conveyor systems comprise an endless conveyor belt, guided over deflection rollers on both ends, and support rollers disposed below the upper run. The weight of the conveyor belt comes to rest on the support rollers. The conveyor belt must be sufficiently tension proof so that on the one hand the tensile forces caused by the conveying motion and on the other the tensile forces exerted on it by the weight of the product being conveyed can be absorbed. The tensile loads on the conveyor belt caused by the weight of the goods decrease with a reduction in the distance between the support rollers supporting the upper run of the conveyor belt. Furthermore, in such prior art conveyor systems the support rollers roll relative to the conveyor belt and the conveyor belt also slides over the support rollers. This causes additional high tensile stress on the conveyor belt and the wear on the conveyor belt is further exacerbated.

There exists a need, therefore, in such prior art conveyor systems either to embody the conveyor belt with a very high tensile strength, whereby the support rollers may be spaced farther apart and fewer rollers are necessary over the total length of the conveying apparatus, or to provide more support rollers which are spaced more closely together, whereby the tensile stresses on the conveyor belt caused by the weight of the goods being conveyed are reduced. In the latter scenario, the belt may be formed with a lesser tensile strength. However, a large number of support rollers are required, which increases the construction cost of the system.

There has become known a conveyor system from European patent disclosure 745 545 A1, which has support tracks formed by support cables along which rollers supported on the two ends of the support beams are guided. That prior art conveyor system is disadvantageous because the support rollers are moving parts, which require continual monitoring and maintenance. British patent disclosure GB 1 195 985 A describes a conveyor belt with support beams oriented transversely to the conveying direction. The support beams are coupled to chains by means of protrusions projecting in the direction of the support beams, and acting as supporting and pulling elements. The protrusions are disposed on both sides of the conveyor belt. Conveyor chains, however, are disadvantageous in that they are substantially more expensive to produce than steel cables, and since for a comparable tensile or supporting capacity they have a greater weight than steel cables. Moreover, they are substantially more vulnerable to malfunction than steel cables, because if a single link breaks, many links are rendered nonfunctional.

With regard to the risk of breakage, conveyor cables must be monitored—preferably by magnetic monitoring—so as to ensure early detection of damage and impending breaks.

Swiss patent disclosure CH 544 712 A deals with a conveyor system with conveyor cables which are guided over rollers and with which the conveyor belt is coupled. Coupling is effected by grooves formed in the conveyor belt in which the conveyor cables fit and in which they are positively retained by form-lock. That prior art conveyor system is disadvantageous, however, since because of tensile stresses on the conveyor belt and the conveyor cables, the requisite coupling between the conveyor belt and the conveyor cables is not assured. Once again, therefore, functional problems can result.

SUMMARY OF THE INVENTION

It is accordingly an object of the invention to provide a conveyor system for transporting goods, which overcomes the above-mentioned disadvantages of the prior art devices and methods of this general type.

With the foregoing and other objects in view there is provided, in accordance with the invention, a conveyor system for transporting goods, comprising:

an endless conveyor belt assembly for transporting goods along a conveying direction, deflection drums disposed at terminal locations of the conveyor system about which the endless conveyor belt assembly is deflected;

the endless conveyor belt assembly including an endless belt and a plurality of support beams oriented transversely to the conveying direction;

two endless conveyor cables disposed laterally of and parallel to the conveyor belt, the conveyor cables traveling on and being deflected about the deflection drums; and clamp assemblies on the support beams for securing the support beams to the conveyor cables.

In other words, the objects of the invention are satisfied in that two endless conveyor cables are guided over deflection drums in the end stations, and the support beams are secured to the cables by means of clamp assemblies.

In accordance with an added feature of the invention, the clamp assemblies are spring clamps including a first clamping jaw rigidly secured to a respective support beam and a second clamping jaw pivotally disposed relative to the first clamping jaw, the first and second clamping jaws resiliently clamping therebetween a respective conveyor cable.

In accordance with an additional feature of the invention, a tensioning device biases the clamping jaws to resiliently engage the conveyor cable. The tensioning device, which is generally known from cable car technology, includes cup springs.

In accordance with another feature of the invention, the deflection drums are formed with an axially central region defining a peripheral wall supporting the conveyor belt, the deflection drums having two lateral cable grooves formed therein in which the conveyor cables are guided circumferentially about the deflection drums.

In accordance with again another feature of the invention, the conveyor belt is attached to an underside of the support beams such that the support beams divide the conveyor belt assembly into individual regions.

In accordance with again a further feature of the invention, the conveyor belt is a corrugated-edge conveyor belt having a bottom face secured to undersides of the support beams and corrugated edges, and wherein ends of the corrugated edges in regions located between the individual support beams are secured to side faces of the support beams.

In accordance with a concomitant feature of the invention, a height of the support beams is substantially equal to a height of the corrugated edges.

Other features which are considered as characteristic for the invention are set forth in the appended claims.

Although the invention is illustrated and described herein as embodied in a conveyor system for transporting goods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2a is an enlarged view of a detail A in FIG. 2;

FIG. 2b is a similar view of a detail B in FIG. 2;

DESCRIPTION OF THE PREFERRED EMBODIMENTS

Figure 1:
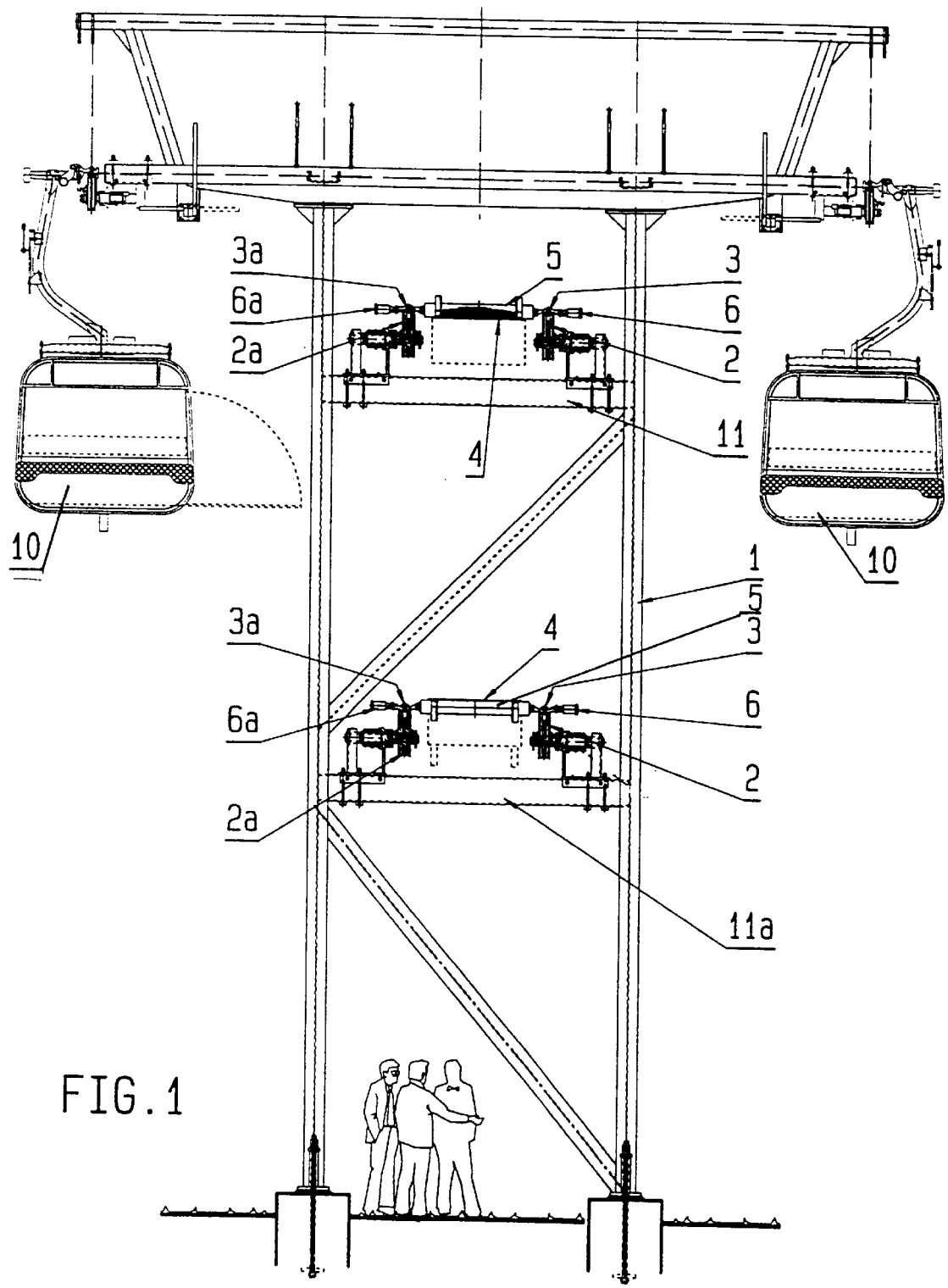
FIG. 1 is an elevational view of a conveyor system according to the invention, viewed along the conveying direction.
Figure 2:
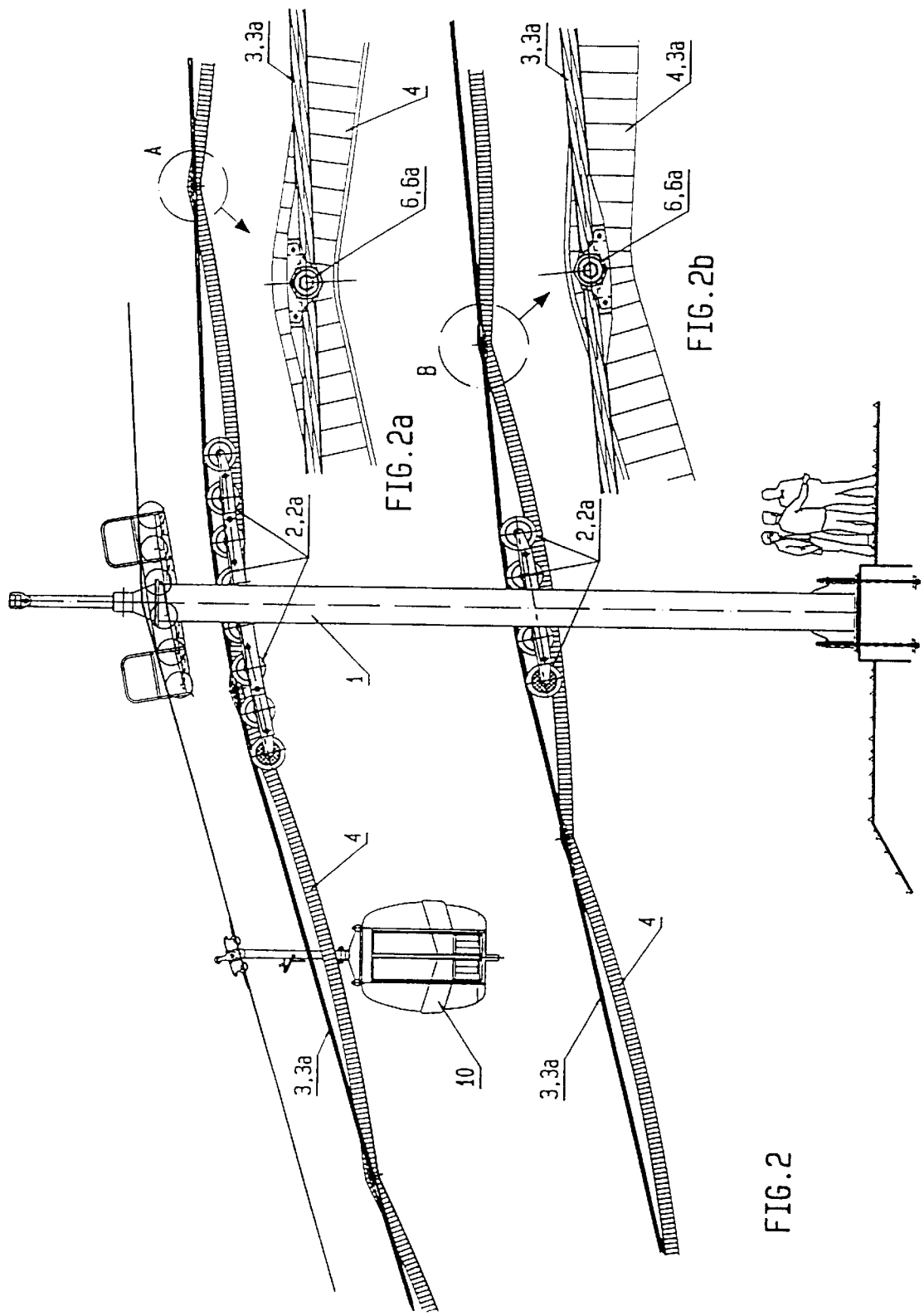
FIG. 2 is a partial side view of the conveyor system of FIG. 1.

Referring now to the figures of the drawing in detail and first, particularly, to FIGS. 1 and 2 thereof, there is seen a support 1 for a conventional cable car system for transporting persons. Rollers are laterally supported on the support 1 in which a suspension and traction cable for chairs, gondolas, or cable cars 10 is guided. The cable car system per se is not the subject of the present invention and, accordingly, it will not be described in further detail.

A conveyor system for transporting goods is disposed inside the support 1. To that end, the support 1 has two transverse beams 11 and 11a, located one above the other, on which rollers 2 and 2a are supported in pairs. This conveyor system further comprises two parallel endless suspension cables 3 and 3a, which are guided in the rollers 2 and 2a and which are guided over deflection drums in the end stations of the conveyor system. The conveyor system also includes an endless conveyor belt 4, which is secured to the undersides of support beams 5 oriented transversely to the direction of motion of the conveyor belt 4. Clamp assemblies 6 and 6a, by means of which the support beams 5 are clamped to the suspension cables 3 and 3a, are disposed at the lateral ends of the support beams 5.

Figure 3:
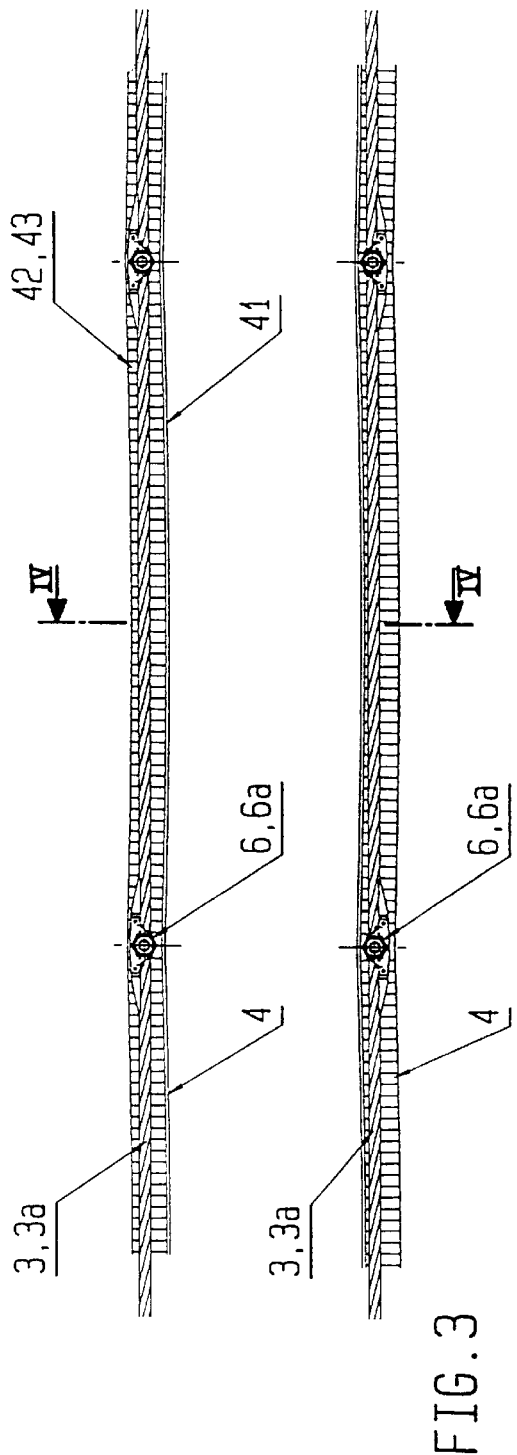
FIG. 3 is a partial side elevational view of the conveyor system of FIG. 1, on a larger scale.
Figure 3A:
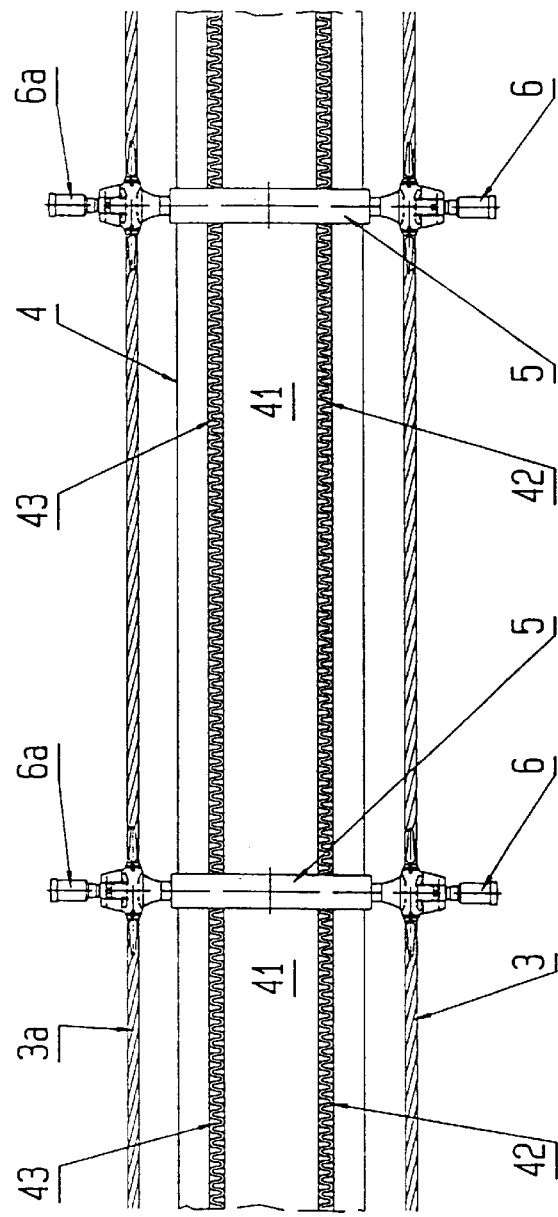
FIG. 3a is a plan view thereof.

With specific reference to FIGS. 3 and 3a, the conveyor belt 4 is a corrugated-edge conveyor belt. The belt 4 has a bottom wall 41 which is secured to the undersides of the support beams 5. Two corrugated side walls 42 and 43 protrude upward from the bottom wall 41. The ends of each of the portions of the side walls 42 and 43 located between the support beams 5 are secured to the side walls of the support beams 5. As a result, the upper run of the conveyor belt 4 is divided by the bottom wall 41, the side walls 42 and 43, and two successive support beams 5, into regions in which goods such as bulk material 40 can be transported.

Figure 4:
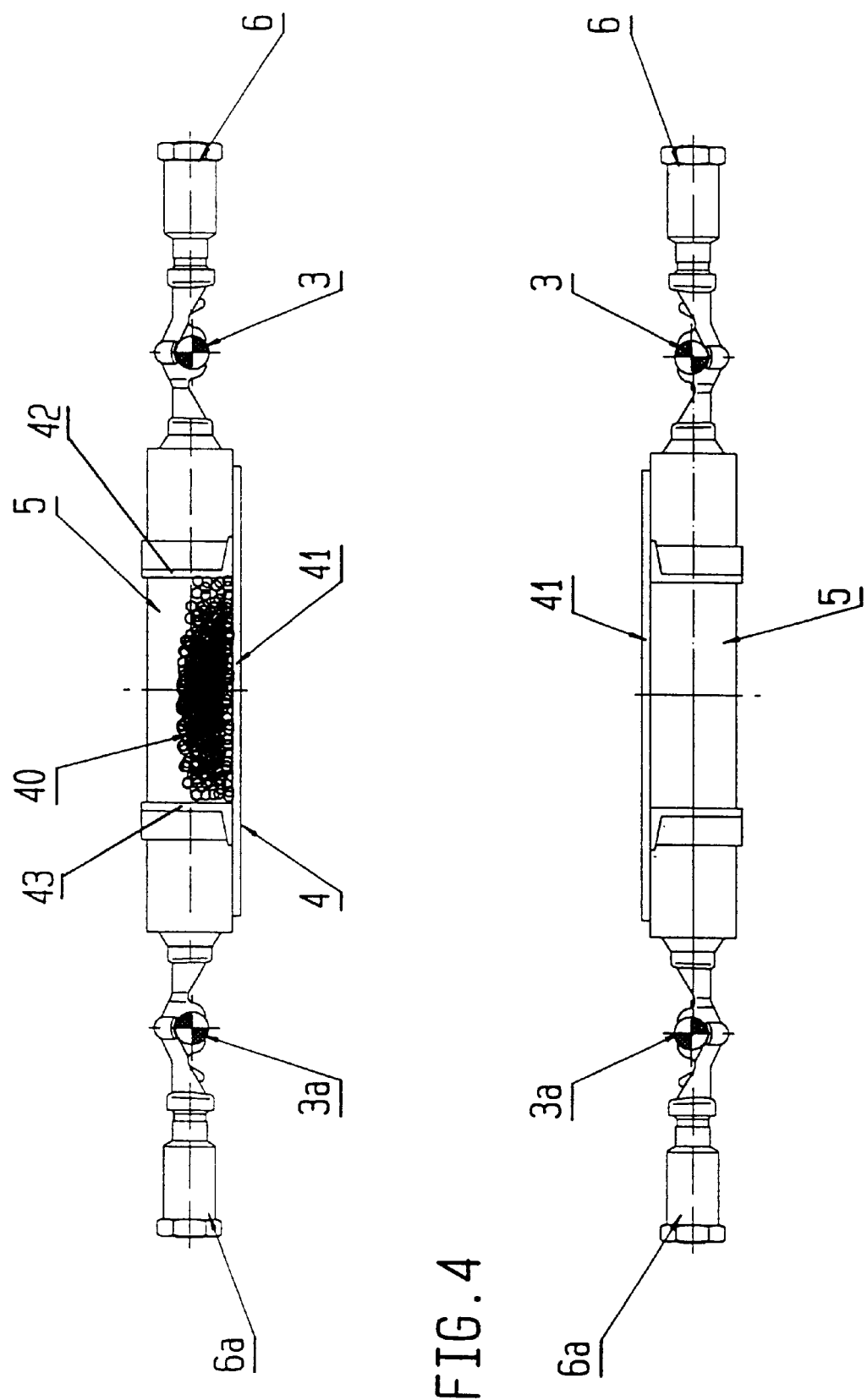
FIG. 4 is a cross sectional view of the conveyor system taken along the line IV—IV of FIG. 3, on a larger scale.

Referring now specifically to FIGS. 4 and 4a, clamp assemblies 6 and 6a are supported on the free ends of the support beams 5. The clamp assemblies 6 and 6a clamp the support beams 5 to the two suspension cables 3 and 3a, respectively, which are located laterally outside the support beams 5.

Figure 5:
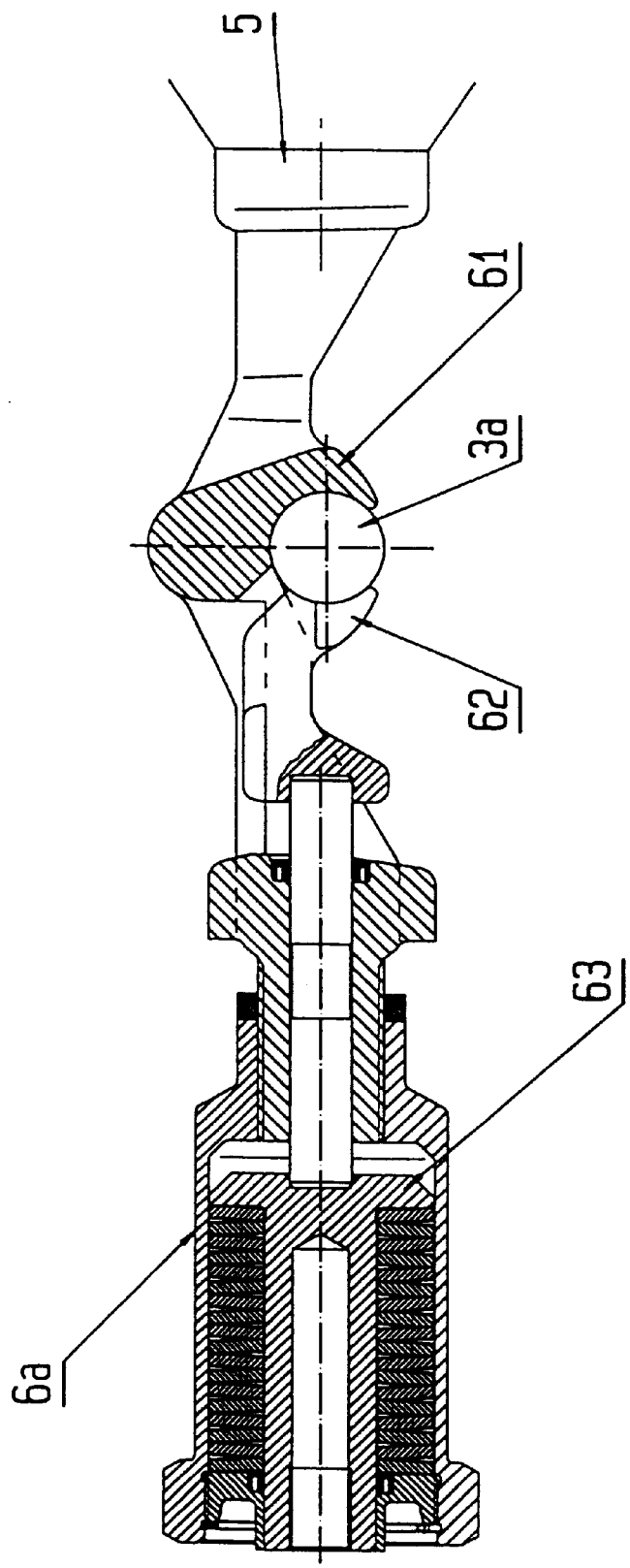
FIG. 5 is a partial section view of a detail of FIG. 4, on a larger scale.

With reference to FIG. 5, the clamp assemblies 6, 6a may be formed by clamps which are otherwise known from cable car technology. There, a first clamping jaw 61 is provided, which is rigidly secured to the support beam 5 and which comes to rest on the suspension cable 3a. A second clamping jaw 62 is displaceable relative to the first clamping jaw 61 by means of a tensioning device 63. The tensioning device 63 includes cup springs, which bias the jaw 62 to rest resiliently on the suspension cable 3a.

It is necessary to secure the conveyor belt 4 in this way, because the cross section of the suspension cables 3 and 3a may vary during the operation of the conveyor system. Resiliently biasing the clamping jaws 61 and 62 against the suspension cables 3 and 3a is necessary in order to securely fasten the conveyor belt 4 to the suspension cables 3 and 3a.

Figure 6:
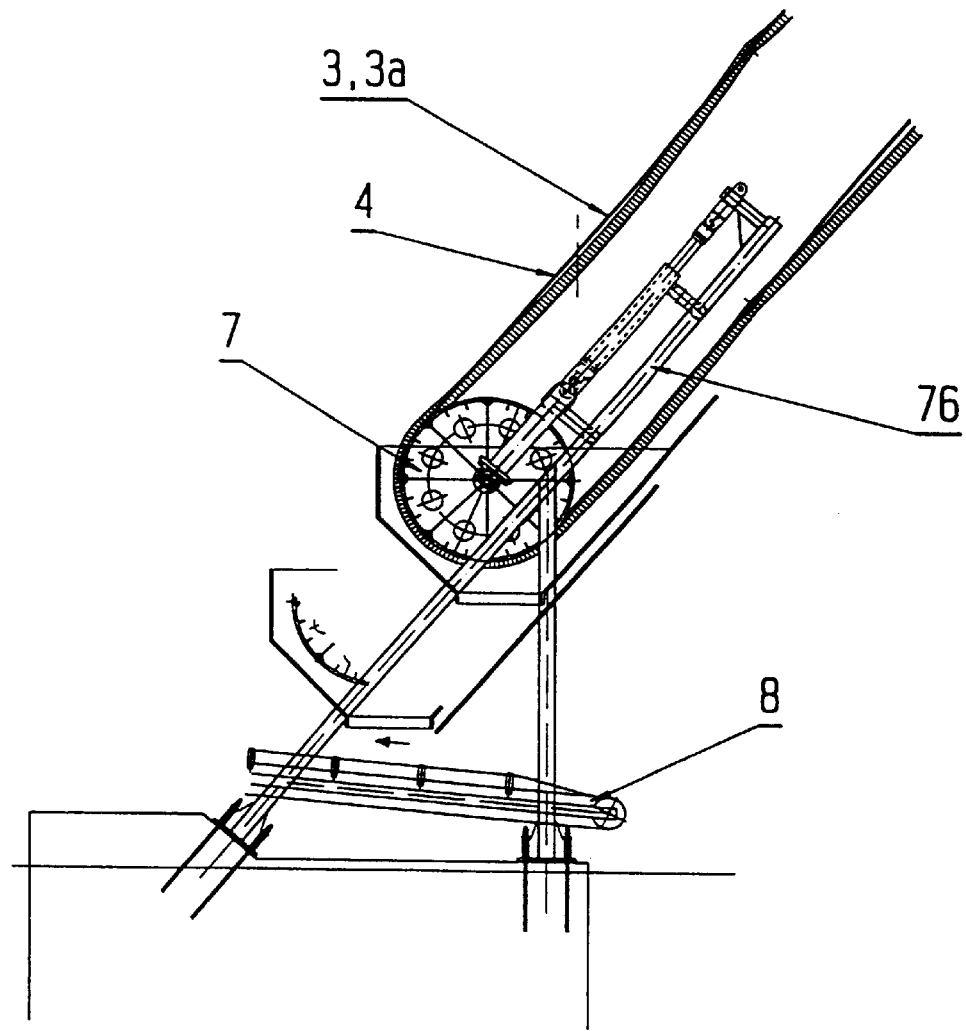
FIG. 6 is a side elevational view of a deflection station of the conveyor system.

With reference to FIG. 6, deflection drums 7 or pulleys 7 are disposed at the ends of the conveyor system, and the suspension cables 3 and 3a and the conveyor belt 4 are guided around them. Each deflection drum 7 has its own tensioning device 76. The respective end of the conveyor belt 4 is also assigned a further conveying device 8, onto which the conveyed product is discharged and by which it is carried onward.

Figure 7:
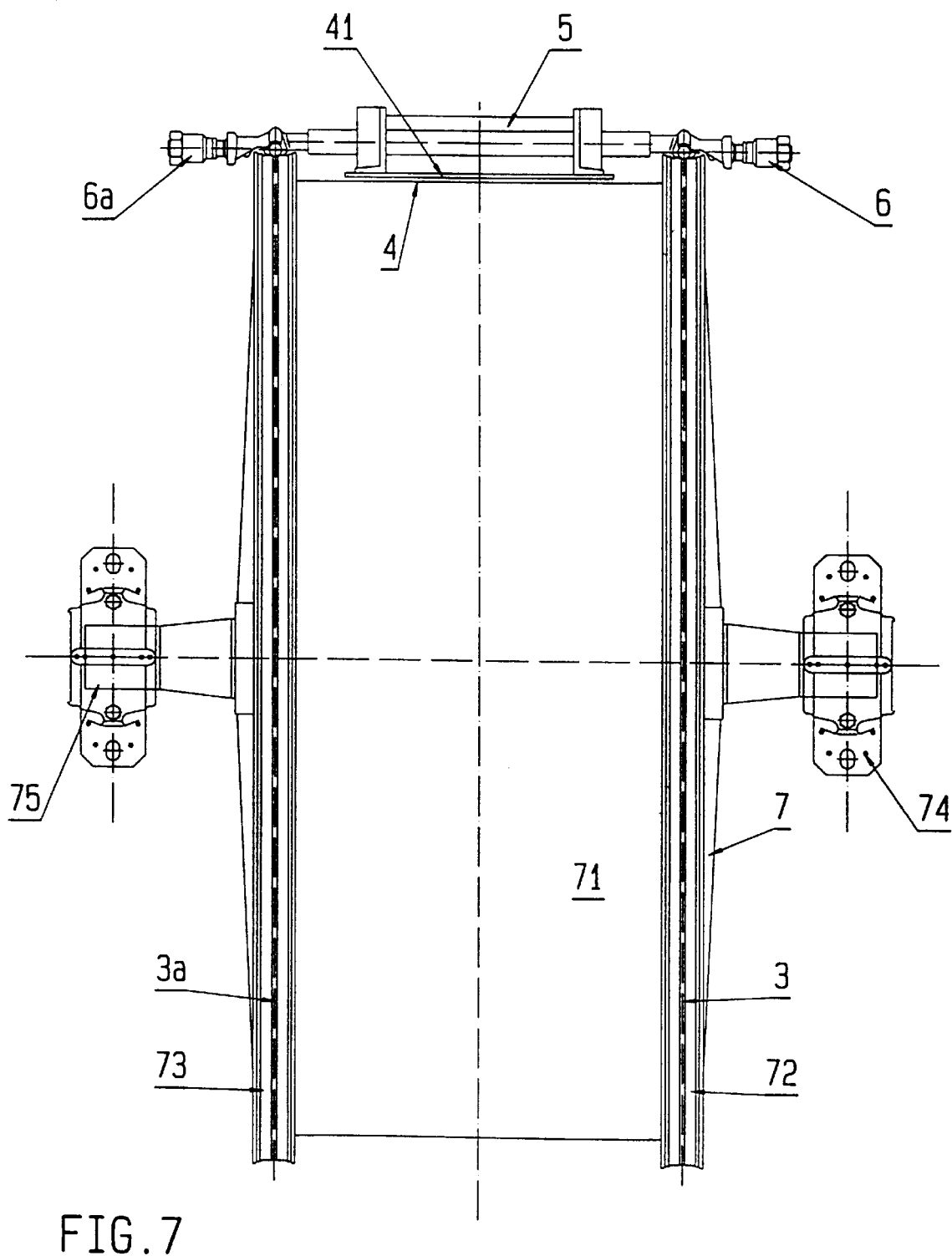
FIG. 7 is a plan view of the deflection station of FIG. 6, on a larger scale.

With reference to FIG. 7, the deflection drum 7 has a central region 71, on which the conveyor belt 4 is guided. Laterally outside the central region 71 the drum 7 is formed two cable grooves 72 and 73, in which the suspension cables 3 and 3a are guided. The deflection drum 7 is rotatably supported in bearing blocks 74 and 75.

I claim:

1. A conveyor system for transporting goods, comprising:
   an endless conveyor belt assembly for transporting goods along a conveying direction, deflection drums disposed at terminal locations of the conveyor system about which said endless conveyor belt assembly is deflected;
   said endless conveyor belt assembly including an endless belt and a plurality of support beams oriented transversely to the conveying direction;
   two endless conveyor cables disposed laterally of and parallel to said conveyor belt, said conveyor cables traveling on and being deflected about said deflection drums; and
   clamp assemblies on said support beams for securing said support beams to said conveyor cables.

2. The conveyor system according to claim 1, wherein said clamp assemblies are spring clamps including a first clamping jaw rigidly secured to a respective said support beam and a second clamping jaw pivotally disposed relative to said first clamping jaw, said first and second clamping jaws resiliently clamping therebetween a respective said conveyor cable.

3. The conveyor system according to claim 2, which further includes a tensioning device biasing said clamping jaws so as to resiliently engage said conveyor cable.

4. The conveyor system according to claim 3, wherein said tensioning device includes cup springs.

5. The conveyor system according to claim 1, wherein said deflection drums are formed with an axially central region defining a peripheral wall supporting said conveyor belt, said deflection drums having two lateral cable grooves formed therein in which said conveyor cables are guided circumferentially about said deflection drums.

6. The conveyor system according to claim 1, wherein said conveyor belt is attached to an underside of said support beams such that said support beams divide said conveyor belt assembly into individual regions.

7. The conveyor system according to claim 1, wherein said conveyor belt is a corrugated-edge conveyor belt having a bottom face secured to undersides of said support beams and corrugated edges, and wherein ends of said corrugated edges in regions located between the individual support beams are secured to side faces of said support beams.

8. The conveyor system according to claim 7, wherein a height of said support beams is substantially equal to a height of said corrugated edges.

* * * * *